Feb. 9, 1960  J. A. ISAACSON ET AL  2,924,126
TORQUE CONVERTER TRANSMISSION
Filed March 12, 1958  6 Sheets-Sheet 2

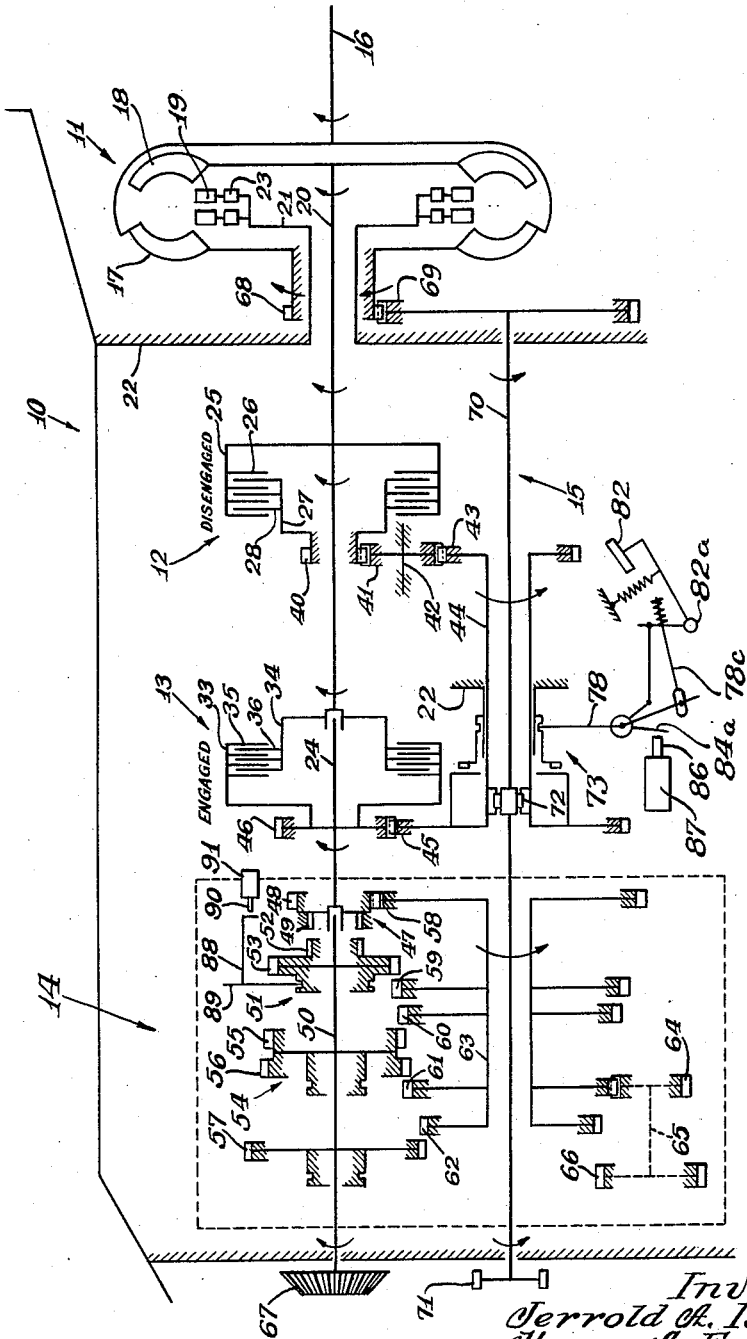

Inventors:
Jerrold A. Isaacson
Henry A. Ferguson
Kazys Raciunas
Paul O. Pippel
Atty.

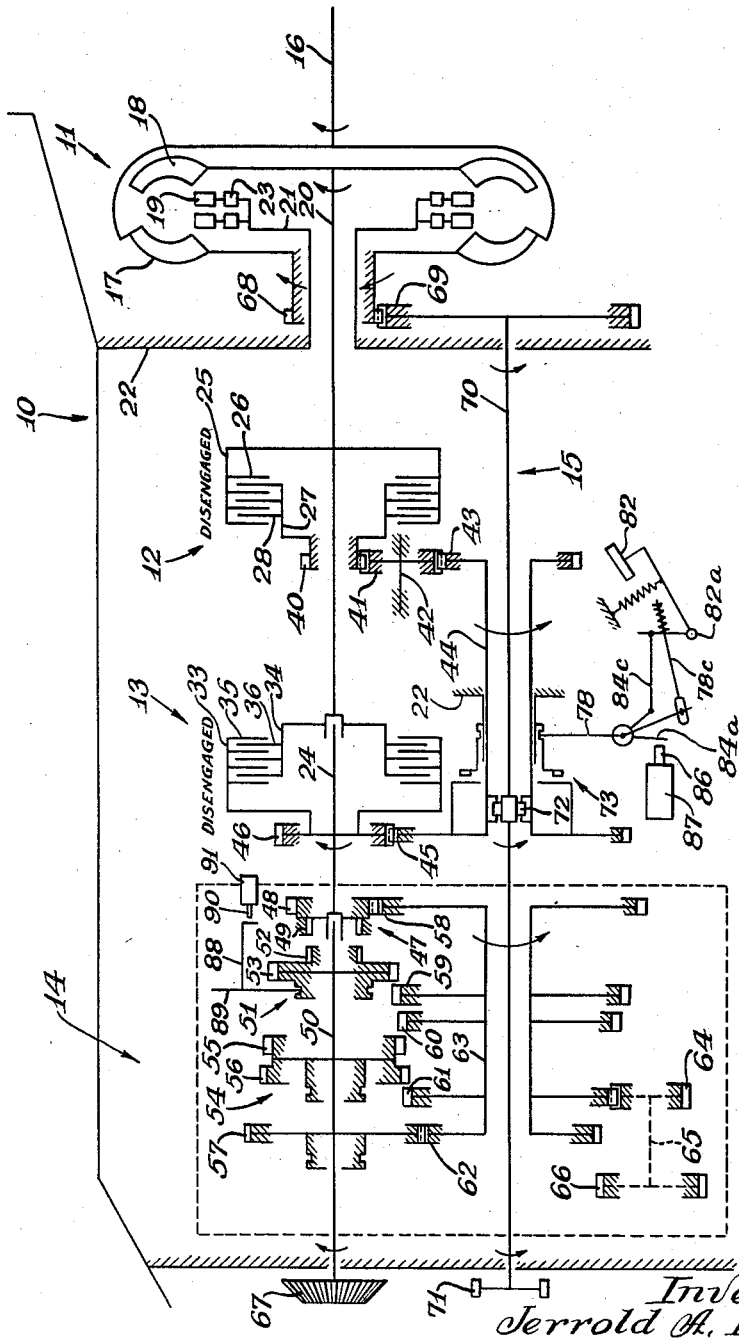

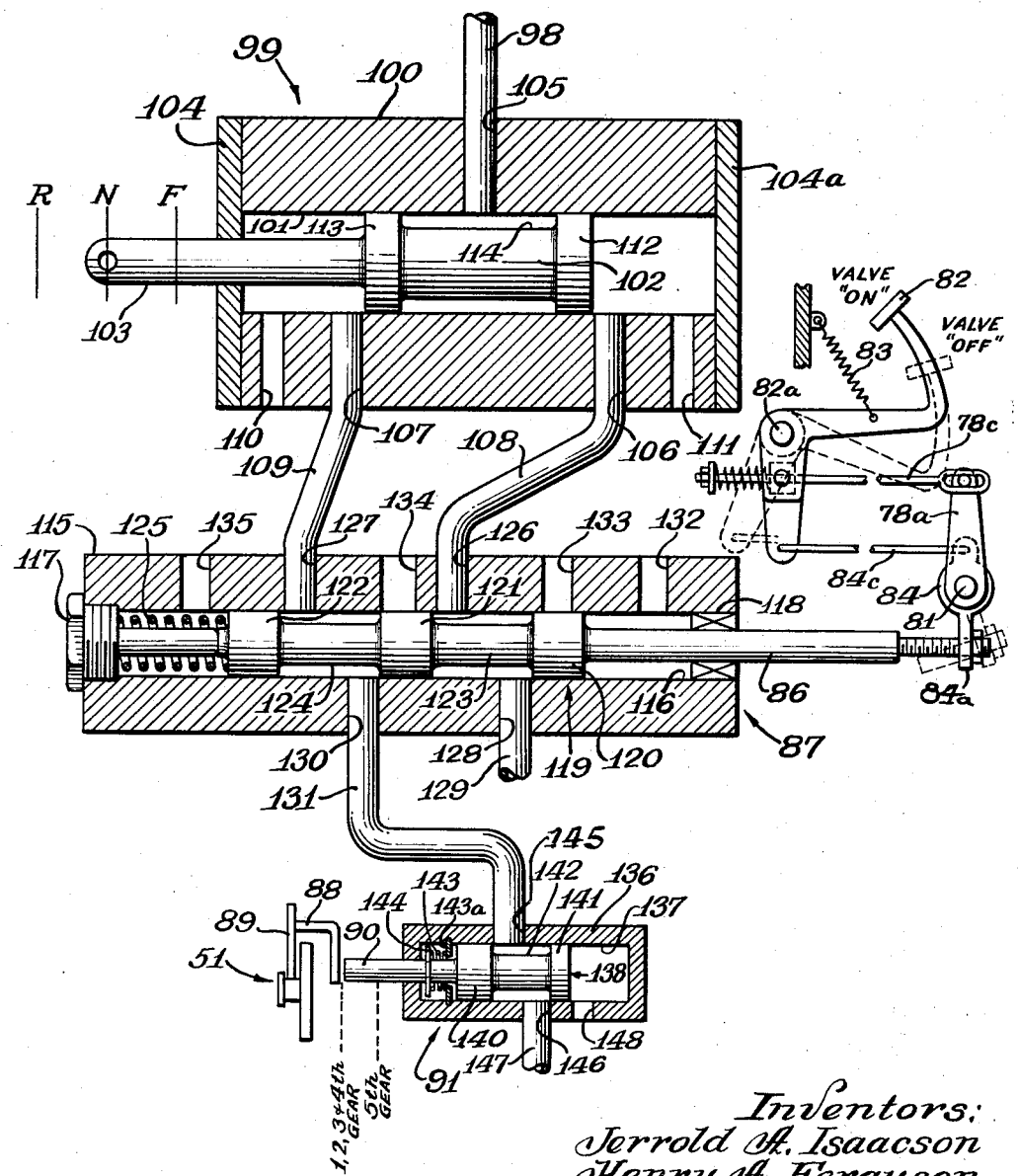

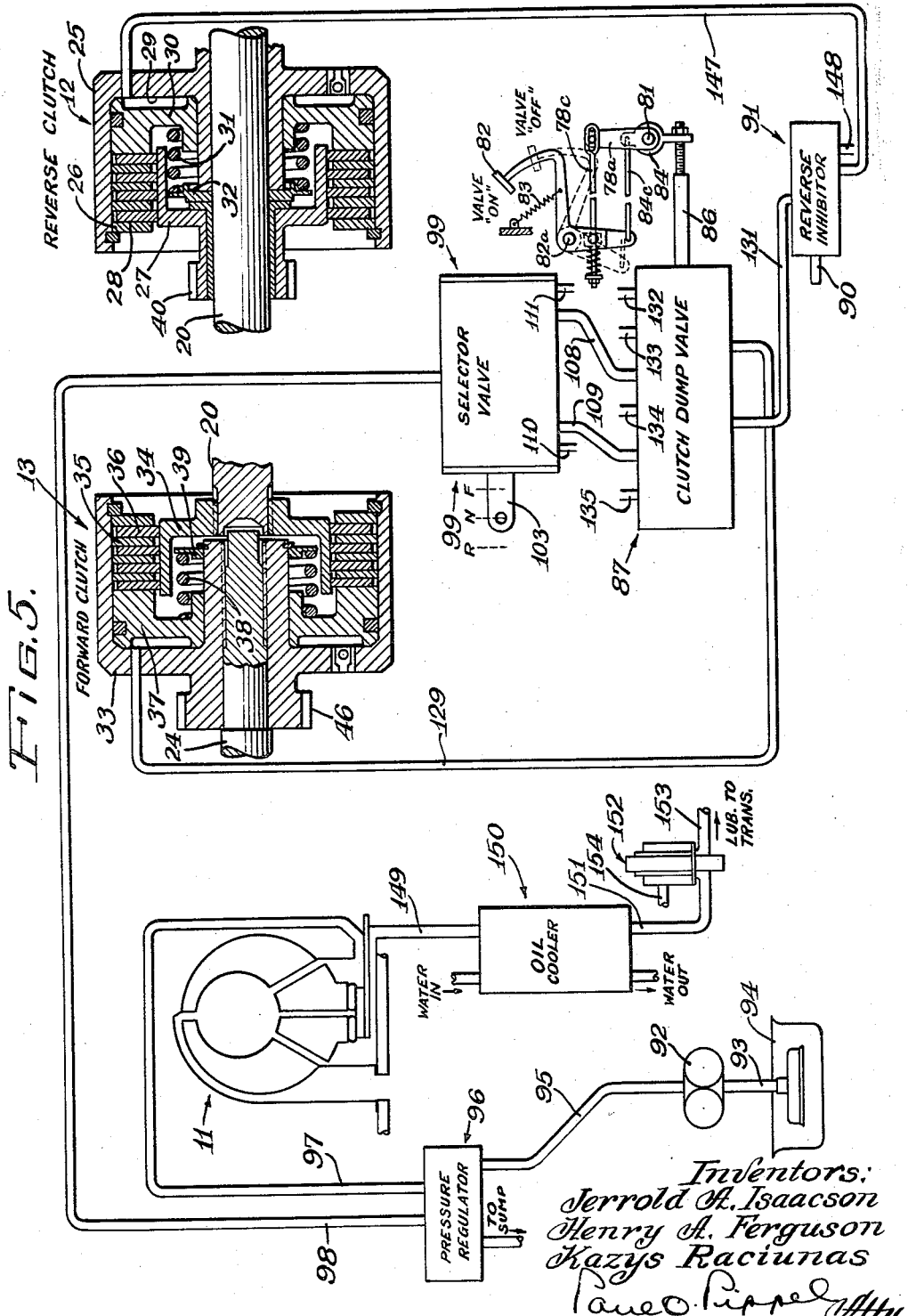

Feb. 9, 1960 J. A. ISAACSON ET AL 2,924,126
TORQUE CONVERTER TRANSMISSION
Filed March 12, 1958 6 Sheets-Sheet 6
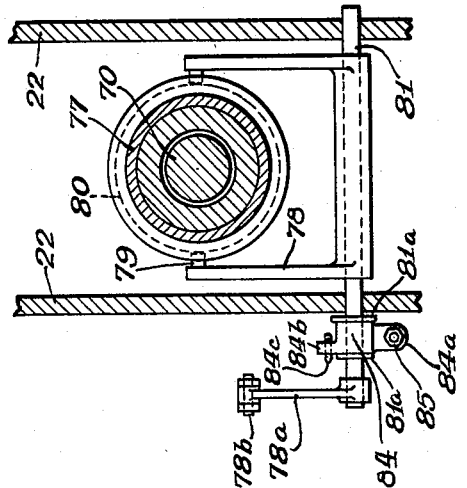
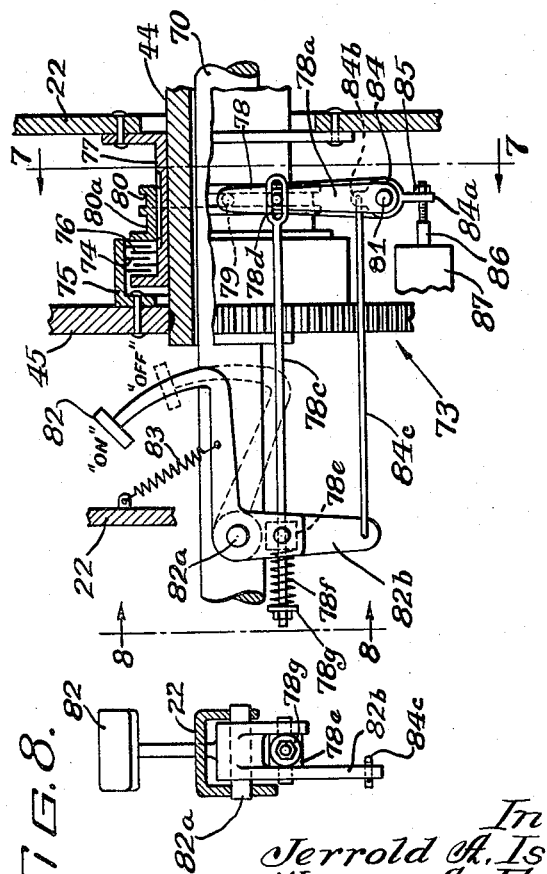
Inventors:
Jerrold A. Isaacson
Henry A. Ferguson
Kazys Raciunas
Paul O. Pippel Atty.

United States Patent Office 2,924,126
Patented Feb. 9, 1960

2,924,126

TORQUE CONVERTER TRANSMISSION

Jerrold A. Isaacson, Lombard, Henry A. Ferguson, Glen Ellyn, and Kazys Raciunas, Cicero, Ill., assignors to International Harvester Company, Chicago, Ill., a corporation of New Jersey Application March 12, 1958, Serial No. 720,843

13 Claims. (Cl. 74—732)

This invention relates to drive transmitting mechanisms, but more particularly it is directed to an arrangement employing a hydro-kinetic type of torque transmitting unit in combination with a change-speed gear box transmission unit and a plurality of selectively operable clutch means, and which is suitable for use in a tractor vehicle.

Heretofore, the hydro-kinetic type of torque transmitting unit has been combined with various forms of drive mechanisms in order to provide a vehicle power transmission unit which could be operated either manually or automatically. As is well known, many variations of such combination have been developed for specific applications and uses and, as a consequence, each such particular combination has been generally limited to use in the specifically designated application for which it was developed. Because of the limitations imposed by such restrictive application and demand, units of this character have not always incorporated therein the characteristics which would enhance their use in a greater variety of applications. One factor of paramount importance which is frequently missing or inadequate in such transmission units is that of flexibility when used with tractor vehicles commonly employed for earth moving operations. In installations of this character it is essential that the vehicle be highly maneuverable and that change in direction of motion from forward to reverse, and vice versa, be accomplished in a very minimum of time and with a minimum of effort. It is also highly desirable that the change in direction of motion be accomplished in substantially the same speed gear ratio so that the operator can back the vehicle away with a load as rapidly as possible. In fact, it has been found that operators of vehicles so employed prefer to move the vehicle away from the point where the loading is done, in a reverse direction, faster than they approach the location of the work in a forward direction. This, of course, is not easily done with a vehicle wherein it is necessary to shift gears to accomplish such objective. As a consequence, most of the mechanisms heretofore provided, which employ the torque converter in combination with other drive units, have been deficient in accomplishing the high degree of maneuverability desired.

Furthermore, the use of the torque converter transmission units heretofore available, with their conventional forward and rear hydraulic pump assemblies, usually involved considerable expense because such units were not only costly to manufacture but also difficult and costly to service.

A further objection to the torque converter type transmission heretofore offered for use in a tractor vehicle arises incident to the well known inherent characteristics of fluid couplings which permit considerable slippage at low speeds and thus militates against the use of such a unit when satisfactory downhill braking by the vehicle engine is essential or desired. This same limiting factor, as is well known, also makes it difficult to start the engine by a push-start of the vehicle.

The present invention as its primary objective envisages the provision of a drive transmitting unit employing a combination of a torque converter, a change-speed transmission gear box and a plurality of clutch means that overcomes the aforementioned faults and drawbacks and, in addition, contemplates the provision of a unit that is economically practicable and readily adaptable for use with conventional vehicle structures.

Another object is to provide a variable speed drive and torque transmitting unit which is extremely flexible in use and, because of such flexibility, permits a vehicle equipped therewith to be highly maneuverable.

A further object is to provide a drive transmitting mechanism for a vehicle wherein drive may be transmitted from the output shaft thereof to the input shaft of said mechanism so as to effectuate engine braking of a vehicle, such as may be desirable when the vehicle is travelling downhill, or to permit starting an engine by a taxi or push-start of a vehicle having said drive incorporated therein.

A still further object is to provide a drive transmitting mechanism wherein the shift or change from a forward to a reverse direction of travel, or vice versa, may be easily and very rapidly accomplished by engagement of friction clutch means without having to effect such change in direction of motion by a shifting of gears in a change-speed gear box transmission unit, and wherein the speed of the vehicle in any selected gear ratio of the change-speed transmission unit thereof with the reverse clutch means engaged will always be greater than when the forward clutch means is engaged.

A yet still further object is to provide a drive transmitting mechanism wherein a snubber brake means may be made operative, to prevent creep of a vehicle so equipped, when the plurality of clutch means incorporated in said drive mechanism are disengaged.

Another specific object is to provide a drive transmitting mechanism having hydraulically actuated clutch means associated therewith, and an anti-creep brake operative to restrict the creeping of said clutch means, and wherein said brake is simultaneously operative with a fluid pressure valve means that controls the actuation of said clutch means.

Another important object involves the provision of a variable speed and torque transmitting mechanism wherein an independent power take-off drive shaft provided therein is operative at one time to provide independent drive for use by auxiliary equipment, and at another time to provide a portion of a power train for transmitting drive, in a vehicle incorporating said mechanism therein, from the final drive thereof mechanically around the fluid coupling elements of the torque converter to the engine or power plant of the vehicle.

A further important object is to provide a torque-converter drive which, although it utilizes only a single hydraulic pump therewith, may be incorporated in a drive transmitting unit wherein torque may be transmitted from the output to the input and mechanically around the fluid coupling elements of the torque converter so as to permit a vehicle equipped with said drive to be pushed in order to start the engine thereof.

Before explaining the present invention in detail it is to be understood that the invention is not limited in its application to the specific details of construction and arrangement of parts illustrated in the accompanying drawings, since the invention is capable of other embodiments and of being practiced or carried out in various ways. It should also be understood that the phraseology or terminology employed herein is for the purpose of description and not of limitation.

The present invention includes the novel construction, arrangements and devices that will subsequently be described and claimed for accomplishing the above noted objects together with such other objects as will be apparent from the following description of a preferred embodiment of the invention, as illustrated, with reference to the accompanying drawings in which:

Fig. 1 is a diagrammatic vertical, longitudinal section through one form of a power transmission mechanism constructed according to the present invention, the forward motion clutch means being engaged and with power flow following the path as indicated by the arrows;

Fig. 2 is a diagrammatic view similar to Fig. 1, but with the reverse motion clutch means engaged and the power flow path as indicated by the arrows;

Fig. 3 is a diagrammatic view similar to the preceding views, but showing both clutch means disengaged and the power flow path, as indicated by the arrows, going from the output shaft through meshing gears of the change-speed transmission and through the overrunning clutch and power take-off shaft to the input shaft, such as when a vehicle is subjected to a push start;

Fig. 4 is a vertical, longitudinal sectional view of the selector, clutch dump and reverse inhibitor valves and the operating elements thereof, which valves are shown only diagrammatically in the other views;

Fig. 5 is a diagrammatic view of a hydraulic control circuit, including a showing in vertical, longitudinal section of the forward and reverse clutch mechanisms, that may be utilized with the present transmission;

Fig. 6 is a detail elevational view, partially diagrammatic and partially in section, showing the snubber brake and its pedal actuating means, and showing also fragmentarily the associated clutch dump valve operable simultaneously with the brake mechanism;

Fig. 7 is a vertical sectional taken on line 7—7 of Fig. 6 and showing details of the snubber brake and its actuating mechanism; and Fig. 8 is a vertical elevational view, partially in section, taken along the line 8—8 of Fig. 7 and showing additional structural details of the snubber brake actuating mechanism.

In the drawings, wherein there is illustrated one preferred form of the invention, the power transmission or drive transmitting device, indicated generally by the reference numeral 10, will be seen generally to include a hydro-kinetic type of torque transmitting unit 11, a pair of friction clutches 12 and 13, a change-speed gear box transmission assembly 14 and a power take-off drive mechanism 15. An input shaft 16 is adapted to receive power from a vehicle engine or power plant (not shown) and transmit it to the torque converter 11 which includes an impeller or driving element 17, a rotor or driven element 18, and a pair of stator or reaction elements 19. The impeller is connected to the input shaft 16, and the rotor 18 is splined or otherwise suitably mounted on a first intermediate shaft 20. The stator elements 19 are rotatably disposed on a central hub 21 fixed with respect to the casing of the transmission, a portion only of which is shown and indicated generally by the reference numeral 22. A one-way roller brake or overrunning clutch 23 is provided between the hub 21 and each of the elements of the stator 19 for allowing the stator to rotate only in the forward direction, for purposes well known in the transmission art. The intermediate shaft 20 may be rotatably disposed with respect to the casing 22 by suitable bearing means (not shown) and this shaft, in turn, has piloted in one end thereof a second intermediate shaft 24. The impeller 17 is rotatably disposed on the central hub 21 by suitable bearing means (not shown), as is well understood.

The first intermediate shaft 20 is fixed to the driving bell or cup 25 of the clutch 12 and splined within said bell are a plurality of friction plates 26. An inner hub or shell 27 has splined thereon a plurality of friction plates 28, which are interleaved with the plates 26, and said inner hub is rotatably mounted on the intermediate shaft 20. The outer shell or bell 25 (Fig. 5) is provided with an annular cavity 29 in which a piston 30 of the same general shape is disposed. The piston is adapted to be moved by fluid under pressure applied thereto, as will be subsequently more fully explained, so as to move the friction plates 26 and 28 together for engaging the clutch. A spring 31 disposed between the piston and a retainer collar 32 fixed to the outer clutch bell 25 functions to move the piston 30 into its retracted position, in which it is shown in Fig. 5 of the drawings.

The clutch 13, even though illustrated as being positioned in face to face relation with clutch 12, is generally similar in structure to clutch 12, and comprises an outer bell or cup 33, an inner hub or shell 34, clutch plates 35 and 36 splined, respectively, to the outer bell and inner hub, a fluid pressure operated piston 37, a spring 38 acting on the fluid piston, and a retainer collar 39 for said spring. The inner hub 34 is splined to the first intermediate shaft 20 and the outer bell 33 is splined to the second intermediate shaft 24.

The clutches 12 and 13 provided herein are of the type commonly referred to as hydraulically actuated, and, preferably, are of the wet type wherein the clutch units are immersed and operated in a bath of oil and hence subject to oil drag when disengaged, as is well understood in the art.

The inner hub 27 of clutch 12 has affixed for rotation therewith a gear 40 which is in constant mesh with a gear 41 mounted on a shaft 42 that, in turn, is suitably journalled in a portion of the casing 22. Gear 41 is in constant mesh with a gear 43 fixed for rotation with a tubular countershaft 44 the opposite end of which has affixed thereto a gear 45 that is in constant mesh with a gear 46 fixed for rotation with the outer bell 33, of clutch 13, thus placing the inner hub 27, of clutch 12, in constant driving connection with the outer bell 33 of clutch 13. The gear 41, disposed in meshing relation between the gears 40 and 43, functions as a reversing idler and causes the inner hub 27, of clutch 12, to rotate always in a direction opposite to that of the outer bell 33, of clutch 13. The gears in the power train, from the reversing motion clutch 12 through the interconnecting countershaft 44 to the intermediate shaft 24, are selected, preferably, so that the speed at which the shaft 24 is rotated when the reversing motion clutch 12 is engaged is somewhat greater (approximately 62% in one preferred design) than when the power train includes the forward motion clutch 13 and said latter clutch is engaged.

The change-speed gear box or transmission unit assembly 14 comprises a gear cluster 47 that includes an external gear 48 and an internal gear 49 both of which are fixed for rotation with the second intermediate shaft 24, a power output shaft 50 piloted in one end of shaft 24, a gear cluster 51 including gears 52 and 53 slidably splined onto the output shaft 50, a gear cluster 54 supporting gears 55 and 56 slidably splined onto the shaft 50, and a gear 57 also splined onto the shaft 50. This gear box unit also includes gears 58, 59, 60, 61 and 62 fixed for rotation with a tubular countershaft 63 and said latter gears are adapted to mesh, respectively, with the gears 48, 53, 55, 56 and 57, and, additionally, includes a reversing gear 64 in constant mesh with gear 61 and fixed for rotation on a shaft 65 with a gear 66 on the opposite end thereof adapted when selected to meshingly engage the gear 57. The power output shaft 50 has a beveled gear 67 on the outer end thereof that is adapted for coupling with the gearing of the final drive mechanism (not shown) provided in the vehicle having the present invention incorporated therein.

The power take-off drive 15 originates with a gear 68 fixed for rotation with the impeller or driving element 17 of the torque converter, and said element, in turn, is connected for rotation with the power input shaft 16. The gear 68 is disposed in constant meshing relation with a gear 69 mounted on one end of a power take-off shaft 70 and fixed for rotation therewith. The power take-off shaft 70 extends through the transmission to a power take-off element, such as the belt pulley indicated at 71, and affixed to the opposite end of the shaft. Said latter shaft is positioned to extend axially through both of the tubular countershafts 44 and 63 and may be suitably journalled therewithin as well as in the casing 22 by any well known bearing means (not shown), as is well understood.

A one-way roller brake or overrunning clutch 72 disposed internally of the tubular shaft 44 is operatively connectable between said shaft and the power take-off shaft 70. Since conventional devices of this character are so well known, it is felt no further detailed description of the construction thereof is necessary. Suffice it to say that this overrunning clutch is arranged so as to be operative for transmitting torque only from the countershaft 44 to the shaft 70 and not from said latter shaft to said countershaft. By being thusly coupled drive may be transmitted from the output shaft 50 through the power take-off shaft 70 and the torque converter 11 to the input shaft 16, but drive cannot be transmitted from the power take-off shaft 70 through said overrunning clutch to the output shaft 50. The purpose of this one-way driving action and the advantages incident thereto will be more fully understood as the description proceeds.

A snubber brake, indicated generally by the reference numeral 73, is provided for braking the interconnecting tubular countershaft 44 together with its associated gears and clutch elements against rotation caused by oil drag of the elements thereof when said clutches are disengaged. This braking action may be accomplished with any one of a number of different means without deviating from the broad teachings of the invention, but, for purposes of illustration (Figs. 6–8) it will be seen to comprise a plurality of friction plates 74 splined onto a shell-like supporting cup member 75 fixedly mounted to the gear 45 and adapted for rotation therewith, a plurality of friction plates 76 interleaved with the plates 74 and splined onto a hub member 77 fixedly mounted to a stationary member such as a portion of the transmission casing indicated at 22, and a bifurcated or yoke-like operating lever 78 having oppositely extending trunnions 79 therein that ride in an annular groove 80 in a sleeve member 80a splined onto the hub 77.

A shaft 81, which is suitably journalled in spaced-apart portions of the casing 22, fixedly mounts the yoke lever 78 thereon and disposed on an outwardly extending end of said shaft is an arm 78a whose opposite end has fixedly mounted therein a pin 78b, while a link member 78c connects said arm with a bifurcated foot pedal bracket member 82. The bifurcated portion of pedal 82 is mounted on a shaft 82a that is suitably supported in a portion of the casing 22 while a spring 83 is reactively anchored between said casing and said pedal.

Rotatively mounted on the shaft 81 and axially disposed between the arms 78 and 78a is a bracket member 84 that is positioned between a pair of spaced apart collars 81a affixed to said shaft to prevent axial displacement of said bracket. The bracket 84 has a rigid arm-like member 84a projecting therefrom with an adjustable screw 85 therein which is adapted to contact or engage an extending plunger rod 86 of a clutch dump valve 87 for actuating said valve. The bracket member 84, additionally, is provided with an arm-like extension 84b that pivotally anchors one end of a rod-like link member 84c therein while the opposite end of said latter link is pivotally anchored in a depending portion 82b of the bifurcated foot pedal bracket 82.

The connecting rod or link member 78c has one end thereof bifurcated with each arm of said bifurcated portion having a slot 78d that receives the pin 78b and thus slidably connects said rod to the arm 78a. A trunnion 78e having an opening therethrough is pivotally mounted in the arms of the bifurcated pedal bracket 82 and is adapted to slidably accommodate the connecting rod 78c through the opening therein. A coil spring 78f positioned over the end of rod 78c is compressibly trapped between the trunnion 78e and a retaining collar 78g affixed to one end of said rod.

A bracket-like arm 88, affixed to a gear speed-ratio operating fork 89 that slidably actuates the gear cluster 51 in the change-speed gear box assembly 14, has a bent-over end portion that is adapted to contact the plunger 90 of a reverse inhibitor valve 91, for actuating said valve against the compressive reaction of spring 143 therein and interrupting the flow of fluid pressure therethrough, when the gear cluster 51 is disposed so that the gears 49 and 52 are placed in meshing relation. In this disposition of the gears the gear train in the change-speed gear box of the vehicle will be conditioned to operate in its highest or fifth forward speed gear ratio, and, since it has been found desirable to avoid the possibilty of accidentally reversing the direction of drive being transmitted thereto from the input shaft, in the event the reversing clutch 12 should accidentally be engaged when the gear box is so conditioned for its highest forward drive speed, the above reverse inhibitor is provided and functions, as explained, to prevent such contingency.

The hydraulic control system generally resembles any one of many other well known control systems, but which has been modified to the extent necessary to accomplish the objectives of the present invention. For an understanding of this system reference is had to Fig. 5 of the drawings wherein the proposed system is illustrated in a simplified diagrammatic fashion. The system, as provided, includes a fluid pressure pump 92, which may be of the gear or any other suitable and well known type, and, as is common practice, may be driven by a gear (not shown) that meshes in constant engagement with the gear 68 fixed for rotation with the driving element 17 of the torque converter. Since the gear 68 rotates with the impeller 17 of the torque converter, it will be apparent that this pump is driven by the input shaft 16. The inlet of pressure pump 92 is connected by a conduit 93 to a sump or reservoir 94 which contains suitable quantities of hydraulic fluid, while the outlet of the pump is connected by a conduit 95 to a pressure regulator, indicated generally by the reference numeral 96. This regulator may be of any suitable or well known conventional type and has an outlet conduit 97 through which fluid under pressure is carried to the torque converter 11, and an outlet conduit 98 connected for carrying fluid under pressure to a selector valve 99.

The selector valve 99 may be of any suitable type, such, for instance, as the valve disclosed and claimed in the copending U.S. application, Serial No. 607,649, filed September 4, 1956, now U.S. Patent No. 2,852,959, dated September 23, 1958, entitled Change Speed Transmission Hydraulic Selector Valve, but for purposes of simplification of the drawings and description there is indicated a simplified version of such adaptable valve which, as illustrated in Fig. 4, comprises a casing or housing 100 having a central bore 101 therethrough which slidably receives a piston 102 therein. A plunger-like extension 103 on said piston may be connected to suitable hand or foot control operating mechanism (not shown), as is well understood. End cover plates 104 and 104a may be provided for suitable affixment to the casing to close the ends of the bore 101, while a port opening 105 in said casing provides communication between the conduit 98 and the bore 101. Port openings 106 and 107 in casing 100 are connected, respectively, by the conduits 108 and 109 to the clutch dump valve 87, while port openings 110 and 111 therein may be connected to the sump 94 by suitable conduits, not shown. The piston 102 is formed with a pair of axially spaced lands 112 and 113 with a groove 114 therebetween. When the piston 102 is moved to the left, from the position shown in Fig. 4, fluid pressure from the conduit 98 is directed along and around the groove 114 and port 107 into conduit 109, and when the piston is moved to the right fluid pressure is directed from conduit 98, via groove 114 and port 106, into conduit 108. Suitable indexing means (not shown) may, of course, be provided for more accurately selecting the proper axially displaced position of piston 102 in the valve, but, since this feature forms no particular part of the present invention, the structural details thereof are omitted.

The clutch dump valve 87 may be fashioned, as seen in Fig. 4, with a casing or housing 115 having a central bore 116 therethrough fitted with a screw type closure plug 117 so as to close one end of the bore, while a bearing plug 118, fitted as a closure into the opposite end of said bore, is provided with an opening therethrough that slidably receives a plunger rod 86 extending from one end of a piston 119 slidably positioned within said bore. The latter piston is formed with three axially spaced lands 120, 121, and 122 having grooves 123 and 124 disposed therebetween. A spring 125 has one end thereof seated against the piston 119 while the other end of the spring seats against the closure plug 117 so as to be axially reactive against one end of the piston. Port openings 126 and 127, respectively, provide communication between the inlet conduits 108 and 109 and the central bore 116 of said valve. A port opening 128 connects with a conduit 129 that communicates with and carries fluid pressure to the forward clutch 13, and a port opening 130 connects with a conduit 131 that communicates with the reverse inhibitor or cut-off valve 91. The clutch dump valve 87 is arranged so that when the plunger rod 86 thereof is moved so as to force piston 119 to the left, as has been done in Fig. 4, against the reaction of spring 125, the lands 121 and 122 are cleared from obstructing the inlet port openings 126 and 127 and fluid pressure is free to pass from the selector valve 99, via of conduits 108 or 109, depending upon the selected position of the selector, into the bore 116 and thence into the selected one of the conduits 129 or 131 to actuate the clutch associated with the respective conduit. On the other hand, when the plunger 86 is moved to the right, from the position shown in Fig. 4, by the reactive force of spring 125 following a downward movement of the foot pedal 82, the dump valve is conditioned to an off position and the lands 121 and 122 are then positioned to block off and prevent the flow of fluid pressure into either one of the port openings 128 or 130, thereby effecting disengagement of the clutches 12 and 13. This dump valve is additionally provided with port openings 132, 133, 134 and 135, disposed as indicated, which may be connected to the sump 94 by suitable conduits (not shown).

The reverse inhibitor or cut-off valve 91 (Fig. 4) may be fashioned to include a casing or body 136 provided with a central bore 137 therein that is adapted to slidably receive a piston 138 from one end of which extends the plunger rod 90 that, in turn, slidably projects through one end wall of said body. The piston 138, it will be seen, includes a pair of axially spaced lands 140 and 141 with a groove 142 therebetween, and a spring 143 reactively disposed between an annular ring 143a seated in the bore 137 and a split ring 144 seated in an annular groove in the plunger rod 90. As thus arranged the spring 143 normally biases or urges the piston 138 to the left, as shown in Fig. 4, so as to provide free communication from the conduit 131, through port opening 145, bore 137 and discharge port opening 146, into the conduit 147 which connects with the reversing clutch 12. Thus, while the piston of this valve is maintained urged to the left, as by the spring 143, the reversing clutch 12 may be activated by fluid pressure directed through the valve and into said clutch. But when the highest, or, as in this instance, the fifth, forward speed gear ratio of the change-speed transmission 14 is engaged, the bracket 88, having been moved to the right from the position shown in Fig. 4 by such selection, will have pushed ahead of it the plunger rod 90. Since this movement operates to slide the land 140, of piston 138, into position to block the flow of fluid pressure from conduit 131, thereby interrupting the flow of fluid pressure into the reversing clutch 12, said clutch is operatively disengaged by virtue of the reactive force of spring 31 therein, and with this clutch disengaged the vehicle cannot be put into reverse by any accidental shifting of the selector valve 99 into the designated reverse position thereof. A port opening 148 in said inhibitor valve may be connected to the sump 94, by a suitable conduit line (not shown), to facilitate dumping of fluid from said reversing clutch upon disengagement thereof.

The discharge from the torque converter 11 may be carried by way of conduit 149 to an oil cooler 150 of conventional construction, while the outlet from said cooler may be directed through a conduit 151 to a conventional lubrication regulator valve 152. The latter valve, in turn, may be connected to the lubrication system of the vehicle through conduit 153 and to the sump 94 by way of conduit 154, all as is well understood in the automatic transmission art.

Operation

The operation of the proposed drive transmitting mechanism may be best understood by following the flow path of the torque or drive through the components of the structure under the various most frequently encountered operating conditions. The power input drive shaft 16, which as understood is driven by a vehicle engine or power plant, is normally rotated in a clockwise direction by the engine, as shown by the arrows in Figs. 1–3, and drivingly rotates the driving element 17 of the torque converter in a similar clockwise direction. At the same time the turbine rotor or driven element 18 of the converter, by virtue of the reaction of the stator elements 19, is rotated clockwise and the intermediate shaft 20 affixed thereto is rotated in the same clockwise direction.

Assuming, now, that selection of the desired speed gear ratio though the transmission 14 has not yet been made and movement of the vehicle in a forward direction is desired. In which case, the foot pedal 82 is first depressed then the selector valve 99 is actuated and set at the "F" or forward motion position, whereupon fluid pressure becomes free to flow from the pump 92 through conduit 95, pressure regulator 96 and conduit 98 into said selector valve. From this latter valve the fluid pressure is directed out through conduit 108 to the clutch dump valve 87, and, by way of conduit 129, to the forward motion clutch 13, to effect the engagement thereof as soon as the foot pedal 82 is released and the dump valve 87 is urged to its "ON" position by the spring 83 which is thereby freed to overcome the reaction of the spring 125 therein. With clutch 13 engaged torque is transmitted from shaft 20 through said clutch to the second intermediate shaft 24 which then rotates also in a clockwise direction (Fig. 1) and, since this latter shaft is coupled to the gear cluster 47, of the change-speed gear box unit 14, said cluster will rotate in a clockwise direction and the gear 48 thereon, being in constant mesh with gear 58, will cause the tubular countershaft 63 to rotate in an opposite or counterclockwise direction. Prior to the release of foot pedal 82, however, an appropriate speed gear ratio must be selected and the respective gears in the change-speed gear box unit 14 engaged to complete said selection, after which torque can be transmitted through the selected gear train to the beveled gear 67 which is maintained in meshing engagement with the final drive of the vehicle (not shown). It will be understood, of course, that since the arrangement and selection of the various gear train combinations through the change-speed unit are generally conventional, explicit and detailed description of the operation and setup of each such combination need not be provided herein. By way of example, however, it may be noted that by meshingly engaging gear 57 with gear 62 the lowest forward vehicle speed may be obtained, while meshing engagement of gear 52 with gear 49 will condition the unit for the highest forward speed gear ratio, and the remainder of the gears therein may be selectively engaged to effect speed gear ratios between these limits. As is well understood, gear 57 may be engaged with reversing gear 66 to effect a change in direction of rotation of the shaft 50 and beveled gear 67 affixed thereto, if desired, in order to produce a change in direction of motion of the vehicle and to operate the vehicle in said reversed direction at a different speed ratio.

When the driving element 17 of the torque converter rotates it carries with it the gear 68, and, since this gear is in constant mesh with the gear 69 on shaft 70, the latter shaft will be rotated in a direction opposite to that of input shaft 16, which, in the present instance, is counterclockwise. The overrunning clutch 72 is constructed and arranged so as to permit the power take-off shaft 70 to rotate in the same direction as countershaft 44 either at the same speed or at a rate of speed in excess of that of the countershaft without interference therebetween, thus it will be seen that drive can be independently transmitted at all times from the input shaft 16 to the pulley 71 for auxiliary equipment purposes.

Assuming, now, that it is desired to rapidly reverse the direction of motion of the vehicle, without changing the speed gear ratio of the change-speed transmission, and yet permit the vehicle to travel forwardly or rearwardly at a rapid rate of speed. In this event the selector valve 99 is actuated and set at the "R" or reverse motion position, whereupon fluid pressure entering said valve through conduit 98 is directed out via conduit 109 and through the clutch dump valve 87, since said dump valve is in its "On" position, and then, by way of conduits 131 and 147, to the reverse motion clutch 12 to effect engagement thereof. When the piston plunger 103, of valve 99, is moved to its "R" position, or to the left from the position viewed in Fig. 4, the land 112 thereon clears the port 106 and thereby allows the forward clutch 13 to be placed in free communication, through conduit 108 and port 111, with the sump 94, whereupon said forward clutch is dumped of hydraulic pressure and subsequently disengaged to permit the reverse clutch 12 to become effective for transmitting drive therethrough. Upon engagement of said reverse clutch, drive is transmitted, in a clockwise direction, from shaft 20 through the latter clutch to the meshing gears 40 and 41 where the direction of rotation is reversed because gear 41, also in mesh with gear 43 mounted on countershaft 44, will cause said countershaft to be rotated in a clockwise direction, and gear 45, on the other end of this countershaft, being in mesh with gear 46 which is fixed for rotation with shaft 24 will cause said latter shaft to rotate in an opposite or counterclockwise direction. This counterclockwise direction of rotation of shaft 24 will then be carried through the selected gear train of gear box 14 to the beveled gear 67 and its associated final drive mechanism to effect movement of the vehicle in a reverse direction, with said drive path as illustrated in Fig. 2.

Assume, now, that the vehicle has been operating in a pre-selected speed gear ratio in a forward direction and it is desired to reverse the direction of motion of the vehicle and also to change the selected speed gear ratio thereof from one ratio to another. In this event the dump valve 87 is moved to its "Off" position, by spring 125 when the foot pedal 82 is depressed, and in this position the lands of the piston 119 in said valve are disposed to interrupt the flow of fluid pressure through the valve thus causing both of the clutches 12 and 13 to be placed in free communication, through ports 133 and 134 of said valve, with the sump 94 whereupon said clutches are dumped of hydraulic pressure and subsequently disengaged by their respective springs. With the valve 87 still in its "Off" position an appropriate speed gear ratio is selected by engaging the respective gears in the change-speed gear box unit 14 in order to complete the selection. Next the selector valve 99 is manipulated so as to set the piston plunger 103 therein at the "R" or reverse motion position, by moving to the left as viewed in Fig. 4, whereupon fluid pressure becomes free to pass through the selector valve and out, by way of discharge conduit 109, to the dump valve 87. Now, when the foot operated pedal 82 is released to the "On" position, fluid pressure will flow from the valve 87 out through conduit 131, inhibitor valve 91 and conduit 147 to the reversing clutch 12 to effect the engagement thereof. As previously described, this will impart an opposite direction of drive to the countershaft 24 and hence a reverse direction of motion to the vehicle.

As thus arranged the vehicle may be rapidly reversed in direction of motion by merely actuating the selector valve 99 without actuating the dump valve 87. However, if it is desired to change the speed gear ratio from one selected speed gear ratio to another speed gear ratio at the time the change in direction of motion of the vehicle is made, the dump valve 87, preferably, is actuated to permit the gear selection to be effected without damage to the gears in the change-speed gear box unit. The foot pedal 82 may also serve as a panic release in the event it becomes necessary for a vehicle operator to interrupt the hydraulic pressure more rapidly than could be done by actuation of the selector valve.

Assume, next, that the change-speed unit 14 is in its fifth, or otherwise highest, speed-ratio gear train, such as would be the case with gears 49 and 52 in meshing relation, when the selector valve 99 is shifted or moved into its reverse clutch actuating setting or position, either accidentally or through an inadvertent action of the operator. In order to establish the highest speed-ratio gear train through the change-speed unit 14 the gear cluster 51, mounted on shaft 50, is slidably moved axially to the right, from the positions shown in Figs. 1, 2 and 3, so that gear 52 thereof meshes with gear 49 of the cluster 47 mounted for rotation with shaft 24. However, as gear cluster 51 slides axially it carries with it bracket 88 which contactingly engages the plunger 90, of reverse inhibitor valve 91, and slides the piston 138 of said valve to the right, from the position shown in Fig. 4, to a position wherein the land 140 thereof blocks the incoming port opening 145 and interrupts the flow of fluid pressure through conduit 147 and into reversing motion clutch 12. This clutch upon being deprived of its actuating hydraulic pressure is then disengaged, by the reaction of spring 31 therein, and hence the vehicle does not go into reverse. This feature, as intended, is operative only to prevent engagement of the reversing clutch 12 when the change-speed unit 14 is conditioned for its highest forward speed, although it is conceivable that it could, if desired, be adapted for other particular speed ratios, as well, without deviating from any teachings of the present invention.

Whenever foot pedal 82 is depressed for actuation of the clutch dump valve 87 the snubber brake mechanism 73 (Fig. 6) is simultaneously and automatically operated. As the pedal 82 is depressed, the rod 84c, being pivotally connected to one end of the pedal bracket 82b, is rotated clockwise, or to the left as viewed in Fig. 6, and the opposite end of said rod rotates the connected bracket 84 counterclockwise about the shaft 81, and, in so doing, moves the adjustable screw 85 therein away from the plunger 86 of the dump valve 87. Upon release of this restrainer the reaction of spring 125 in said valve moves the piston 119 thereof to the right and interrupts the flow of fluid pressure therethrough from the selector valve thereby permitting the particular clutch then engaged to be dumped and subsequently disengaged. When the pedal 82 starts its depressing movement, it carries with it the rod or link member 78c, which, as previously noted, is connected to the pedal by the pivotally mounted trunnion 78e and trapped spring 78f while the bifurcated opposite end of said rod slides by way of the slots 78d on the pin 78b carried by the arm 78a. After the rod 78c has moved a distance delimited by the longitudinal dimension of the slots 78d, the end of each of said slots engages the pin 78b and rotates the arm 78a together with its attached shaft 81 counterclockwise, thereby causing the yoke 78 to engage and slide the sleeve 80a axially to the left, as viewed in Fig. 6, and effect engagement of the friction plates 74 and 76 in the brake. This engagement of said friction plates operates to ground the gear 45 to the casing 22 and thereby stop rotation of the attached tubular countershaft 44, which, because of oil drag incident to the use of the wet type clutch in the drive transmitting unit, has a tendency to creep thus causing the vehicle to do likewise. Of course, when the pedal is released, to effect engagement of the valve 87, brake 73 is simultaneously disengaged and countershaft 44 again is free to rotate. As thus arranged, the operation of the pedal 82 first actuates the valve 87 and provides the engaged clutch an opportunity to be emptied of hydraulic fluid pressure a short time before the snubber brake is applied. In this way the engaged clutch has a chance to be disengaged before the brake is applied so that braking against the hydraulic pressure in the clutch is precluded.

The trapped spring 78f provides a safety release effect which prevents applying an excessive amount of pressure on the snubber brake mechanism. After the pedal 82 has been fully depressed and the friction plates 74 and 76 completely engaged any further pressure applied by the operator to the pedal will be taken up by the spring 78f without transmitting said excess to the brake plates. It will be appreciated, therefore, that as thus arranged this spring does provide a simplified means for limiting the pressure that might be applied to the snubber brake mechanism without otherwise interfering with the operation thereof.

One of the salient features of the present invention revolves around the means provided to effectuate push-starting of the vehicle. i.e., pushing the vehicle to start the engine thereof. When it is desired for one reason or another to start the engine by pushing or towing the vehicle the selector valve 99 is set at the "F" or forward motion position thereof and dump valve 87 is engaged by releasing the foot pedal 82, while the change-speed unit 14 is conditioned for transmitting drive therethrough by selecting any one of its forward speed-ratio gear trains and then engaging the respective gears therein to set up that selected speed-ratio, such as the gears 57 and 62 as shown in Fig. 3. Now, when the vehicle is pushed or towed, torque will be transmitted from the final drive through the selected power train of the change-speed unit 14 to the shaft 24 which will thereupon be rotated in a clockwise direction, and gear 46, being fixed for rotation with said shaft and in meshing engagement with gear 45 affixed to countershaft 44, will cause countershaft 44 to rotate in an opposite or counterclockwise direction. At the start of this operation, however, the power take-off shaft 70 is stopped, as is the vehicle engine, thus when the countershaft 44 rotates concentrically about shaft 70 the overrunning clutch 72 becomes operative to grip said power take-off shaft and cause it to rotate in a similar counterclockwise direction. Since gear 69, on the power take-off shaft 70, is in continuous mesh with gear 68, which is fixed for rotation with driving element 17 of the torque converter, it will be appreciated that the driving element of the converter will also be rotated, but in an opposite or clockwise direction. The direct connection between the driving element 17 and the input shaft 16 will then be operative for effecting rotation of said input shaft and the turning over of the engine attached thereto in order to start the engine.

The overrunning clutch 72 also is operative to aid in effecting engine braking when a vehicle equipped with this drive transmitting mechanism is traveling downhill. This is brought about by the fact that this one-way clutch is arranged so as to permit the power take-off shaft 70 to rotate counterclockwise at speeds in excess of the rate of counterclockwise rotation of the countershaft 44, but when said countershaft tends to rotate faster than the power take-off shaft 70, as would be the case when the vehicle goes downhill, the gripping elements of said clutch become operative, thereby causing the countershaft to act as a driving shaft tending to drive the power take-off shaft against the retarding or holding effect of the engine's compression. When this happens the engine's compression begins to function as a retarder or braking means and, as a consequence, the vehicle can be maintained under better control without an excessive use of its conventional brake system.

While only one form of the invention has been shown and described, it will be obvious to those skilled in the art that it is not so limited, but is susceptible of various changes and modifications without departing from the spirit thereof, and it is desired, therefore, that only such limitations shall be placed thereon as are specifically set forth in the appended claims.

What is claimed is:

1. A drive transmitting device comprising in combination a first power shaft, a second power shaft, an intermediate drive shaft, a hydro-kinetic torque converter including a driving element connected to said first shaft and a driven element connected for driving said intermediate shaft, means connecting said intermediate shaft with said second power shaft including a plurality of alternatively operable clutch means each of which includes a driven element and direction of rotation reversing means interconnecting the driven element of one of the plurality of clutch means with the driven element of another of said means and operative to reverse the direction of drive transmitted therebetween, said plurality of clutch means being disposed so that engagement of one of said clutch means effects the transmission of drive from the intermediate shaft to the second power shaft so as to cause said second shaft to rotate in the same direction as said first power shaft and engagment of another of said clutch means effects the rotation of said second power shaft in a direction reverse to that of said first power shaft, additional driving means connectable between the direction of rotation reversing means and said first power shaft by way of the driving element of the torque converter and without driving through the intermediate shaft and the torque converter driven element for transmitting drive from said second power shaft to said first power shaft when said plurality of clutch means are disengaged.

2. A drive transmitting device comprising in combination, a first power shaft, a second power shaft, an intermediate drive shaft therebetween, a hydro-kinetic torque converter including a driving element connected to said first shaft and a driven element connected for driving said intermediate shaft, means connecting said intermediate drive shaft with said second power shaft including a plurality of alternatively operable clutch means each of which includes a driven element and interconnecting means drivingly connecting the driven elements of said plurality of clutch means with one another and operative to reverse the direction of rotation of drive transmittable therebetween, said plurality of clutch means being disposed so that engagement of one of said clutch means effects the transmission of drive from said intermediate shaft to the second power shaft causing said second shaft to rotate in the same direction as the first power shaft and engagement of another of said clutch means effects the transmission of drive from said latter clutch means through said interconnecting means and causes rotation of said second power shaft in a direction reverse to that of said first power shaft, power take-off means including a power take-off shaft drivingly connected with the driving element of said torque converter and operative to effect the transmission of drive from said first power shaft to the power take-off shaft independent of the operation of said driven element and the intermediate shaft, and overrunning clutch means connected between said interconnecting means and said power take-off means and operative to permit the transmission of drive from said second power shaft to said first power shaft when said plurality of clutch means are disengaged.

3. A drive transmitting device comprising in combination, a first power shaft, a second power shaft, an intermediate drive shaft coaxially disposed therebetween, a hydro-kinetic torque converter connected to said first power shaft and driving said intermediate shaft, means connecting said intermediate drive shaft with said second power shaft including a pair of alternatively operable clutch means each having a driving and a driven element and interconnecting means drivingly connecting the driven element of one clutch means with the driven element of the other clutch means and operative for reversing the direction of rotation of drive transmitted between the intermediate and second power shafts, said pair of clutch means being disposed and arranged so that engagement of one of said clutch means effects the transmission of drive from said intedmediate shaft to the second power shaft so as to cause said second shaft to rotate in the same direction as said first power shaft and engagement of the other of said clutch means effects the transmission of drive from said intermediate shaft through said latter clutch means and through said interconnecting means so as to cause rotation of said second power shaft in a direction reverse to that of said first power shaft, auxiliary power take-off means including a power takeoff shaft drivingly connected by means of said torque converter to said first power shaft and operative to effect the transmission of drive from said first shaft to the power take-off shaft independent of the operation of said intermediate shaft, and one-way drive-transmitting means connected between said interconnecting means and the power take-off shaft operative to permit the transmission of drive from said second power shaft to said first power shaft when said pair of clutch means are disengaged.

4. A drive transmitting device comprising in combination, a first power input shaft, a second power shaft, an intermediate drive shaft disposed coaxially therebetween, a hydro-kinetic torque converter including a driving element connected to said first power shaft and a driven element connected for driving said intermediate shaft, means connecting said intermediate drive shaft with said second power shaft including a plurality of alternatively operable clutch means each of which includes a driven element and reversing drive means interconnecting the driven elements of said plurality of clutch means with one another and operative to reverse the direction of rotation of drive transmittable therebetween, said plurality of clutch means being disposed so that engagement of one of said clutch means effects the transmission of drive in one direction of rotation from said intermediate shaft to the second power shaft and engagement of another of said clutch means effects the transmission of drive from said intermediate shaft through said reversing drive means to the second power shaft so as to cause rotation thereof in a reverse direction, said reversing drive means including a tubular countershaft member having its longitudinal axis parallel to the axis of rotation of said first, second and intermediate shafts, a power take-off shaft mounted within and extending through said tubular countershaft and drivingly connected by means of the driving element of said torque converter to said first power shaft and operative independently of the operation of said driven element and the intermediate shaft, and an overrunning clutch connected between said tubular countershaft and said power take-off shaft capable of transmitting drive from said tubular countershaft through said power take-off shaft to said first power shaft by way of the driving element of the torque converted and without driving through the driven element of said converter when said plurality of clutch means are disengaged.

5. A drive transmitting device comprising in combination, a first power shaft, a second power shaft, an intermediate drive shaft coaxial with said first and second shafts, a hydro-kinetic torque converter including a driving element connected to said first power shaft and a driven element connected for driving said intermediate shaft, means connecting said intermediate drive shaft with said second power shaft including a pair of alternatively operable clutch means each having a driving and a driven element and reversing drive means interconnecting the driven element of one clutch means with the driven element of the other clutch means and operative for reversing the direction of rotation of drive transmitted between the intermediate and second power shafts, said pair of clutch means being disposed and arranged so that engagement of one of said clutch means effects the transmission of drive from said intermediate shaft to the second power shaft so as to produce rotation thereof in the same direction as that of said first power shaft and engagement of the other of said clutch means effects the transmission of drive from said intermediate shaft through said latter clutch means and through said reversing drive means so as to produce rotation of the second power shaft in a direction reverse to that of said first power shaft, said reversing drive means including a tubular countershaft member having its longitudinal axis of rotation parallel to that of said first, second and intermediate shafts, auxiliary power take-off means including a power take-off shaft drivingly connected by way of the driving element of the torque converter to said first power shaft and operative independently of the operation of the driven element of the torque converter, and one-way drive-transmitting means disposed between said tubular countershaft and said power take-off shaft and operative to permit the transmission of drive from said second power shaft to said first power shaft by way of the driving element of the torque converter when said pair of clutch means are disengaged.

6. A drive transmitting mechanism comprising in combination, a first power shaft, a second power shaft coaxially disposed with respect to said first shaft, means for connecting said first power shaft with said second power shaft including a pair of alternatively operable clutch means each of which includes a driven element and reversing drive means connecting the driven element of one of said clutch means with the driven element of the other of said clutch means and operative for reversing the direction of rotation of drive transmitted from one of said clutch means to the other, said pair of clutch means being selectively operable for transmitting drive from the first power shaft to the second power shaft in one direction of rotation when one of said clutch means is engaged and in an opposite direction of rotation when the other of said clutch means is engaged and drive is transmitted through said reversing drive means to the second power shaft, hydraulic means for actuating said pair of clutch means including a source of fluid pressure, hydraulically actuated devices for each clutch means, a selector valve manually operable for connecting said source at will to either of the hydraulically actuated devices, and a second valve selectively connectable between said selector valve and each of said hydraulically actuated devices and manually operable for interrupting the connection of said source of fluid pressure with a selected hydraulically actuated device so as to modify the effect of said first-mentioned valve in producing the actuation of said hydraulically actuated device.

7. A drive transmitting device comprising in combination, a first power shaft, a second power shaft, means for connecting said first power shaft with said second power shaft including a plurality of clutch means each of which includes a driven element and reversing drive means interconnecting the driven elements of said clutch means and operative for reversing direction of rotation of drive transmitted therebetween, said plurality of clutch means being selectively operable for transmitting drive in one direction of rotation from the first power to the second power shaft through said reversing drive means when one of said clutch means is engaged and in an opposite direction of rotation from the first power to the second power shaft without going through said reversing drive means when another of said clutch means is engaged, braking means operable for braking said reversing drive means when said plurality of clutch means are disengaged, hydraulic means for actuating said plurality of clutch means including a source of fluid pressure hydraulically actuated devices for each clutch means, and a selector valve operable for connecting said source at will to either of the hydraulically actuated devices, and a second valve connected between said selector valve and said hydraulically actuated devices and operable for modifying the effect of said selector valve on the selected hydraulic device, and operating means connected with said braking means and with said second valve and simultaneously operable for operating said second valve and for operating said braking means.

8. A drive transmitting device comprising in combination, a casing, a first power shaft, a second power shaft, means connecting said first power shaft with said second power shaft including a plurality of clutch means each of which includes a driven element and reversing drive means interconnecting the driven element of one of said plurality of clutch means with said second power shaft and operative for reversing the direction of rotation of drive transmitted therebetween, said plurality of clutch means being selectively operable for transmitting drive in one direction of rotation from the first power to the second power shaft when one of said clutch means is engaged and for transmitting drive from the first power to the second power shaft through said reversing drive means so as to cause rotation of the second power shaft in a reverse direction when another of said clutch means is engaged, braking means connected between said casing and said reversing drive means and operable for preventing the rotation of said drive means when said plurality of clutch means are disengaged, hydraulic means for actuating said plurality of clutch means including a source of fluid pressure, hydraulically actuated devices for each clutch means, a selector valve operable for connecting said source at will to either of the hydraulically actuated devices, and a second valve connected between said selector valve and said hydraulically actuated devices and actuable for modifying the effect of said selector valve on a selected hydraulic device, manually operable means connected with said braking means and with said second valve and positionable in one position for actuating said second valve so as to condition it for establishing fluid pressure communication therethrough and concomitantly disengaging said brake means and in another position for actuating said second valve so as to condition it for interrupting fluid pressure communication therethrough and concomitantly engaging said brake means.

9. A drive transmitting device comprising in combination, a casing, a first power shaft, a second power shaft, means connecting said first power shaft with said second power shaft including a pair of clutch means each of which includes a driven element and reversing drive means interconnecting the driven element of one of said clutch means with the second power shaft and operative for reversing the direction of rotation of drive transmitted from said one of said clutch means to the second power shaft, said pair of clutch means being selectively operable for transmitting drive in one direction of rotation from the first power to the second power shaft when one of said clutch means is engaged and for transmitting drive from the first power to the second power shaft through said reversing drive means so as to cause rotation of the second power shaft in a reverse direction when the other of said clutch means is engaged, said reversing drive means including a countershaft member having its longitudinal axis of rotation parallel to the longitudinal axes of the first and second shafts, braking means mounted in part on said casing and operably engageable for preventing the rotation of said reversing drive means when said pair of clutch means are disengaged, hydraulic means for actuating said pair of clutch means including a source of fluid pressure, hydraulically actuated devices for each clutch means, and a selector valve operable for connecting said source at will to either of the hydraulically actuated devices, and a second valve connected between said selector valve and said hydraulically actuated devices and actuable for modifying the effect of said selector valve on a selected hydraulic device, manually operable mechanism connected with the portion of said braking means mounted on the countershaft and with said second valve and positionable in one position for effecting the engagement of said second valve and the disengagement of said brake means and in another position for effecting the actuation of said second valve so as to condition it for interrupting fluid pressure communication therethrough and the concomitant therewith engagement of said brake means.

10. A drive transmitting device comprising in combination, a power input shaft, a power output shaft, a change-speed transmission having power trains of different speed ratios selectively providable therethrough and being drivingly connected to said power output shaft, means for connecting said power input shaft with said change-speed transmission including a pair of clutches each of which includes a driven element and reversing means interconnecting the driven elements of said clutches with one another and operative for reversing direction of rotation of drive transmitted between said input shaft and the change-speed transmission, said clutches being selectively operable for transmitting drive from the input shaft to the change-speed transmission so as to cause rotation of the output shaft in one direction when one of said pair of clutches is engaged and in another direction when the other of said pair of clutches is engaged, hydraulic means for actuating said clutches including a source of fluid pressure, hydraulically actuated devices for each of said clutches, a selector valve operable for connecting said source at will to either of said hyraulically actuated devices, and an additional valve connected between said selector valve and one of said hydraulic actuating devices and actuable for modifying the effect of said selector valve on the said one hydraulic actuating device when the device to which said additional valve is connected is the one selected for actuation, and valve actuating means associated with a power train element of said change-speed transmission and engageable with said additional valve and operable incident to the selection of a predetermined speed-ratio power train in said transmission for actuating said additional valve so as to modify the effect of said selector valve and prevent the actuation of the said one hydraulic actuating device.

11. A drive transmitting device comprising in combination, a power input shaft, a power output shaft, a change-speed transmission having power trains of different speed ratios selectively providable therethrough and being drivingly connected to said power output shaft, means for connecting said power input shaft with said change-speed transmission including a pair of clutches each of which includes a driven element and reversing means interconnecting the driven element of one of said clutches with said power output shaft and operative for reversing direction of rotation of drive transmitted between said input shaft and the change-speed transmission, said clutches being selectively operable for transmitting drive from the input shaft to the change-speed transmission so as to cause rotation of the output shaft in one direction when one of said pair of clutches is engaged and in another direction when the other of said pair of clutches is engaged, hydraulic means for actuating said clutches including a source of fluid pressure, hydraulically actuated devices for each of said clutches, a selector valve operable for connecting said source at will to either of said hydraulically actuated means, and an additional valve connected between said selector valve and the hydraulically actuated device which actuates the clutch that causes the change-speed transmission to rotate in a reverse direction and actuatable for modifying the effects of said selector valve on said later hydraulically actuated device and valve actuating means associated with a power train element of said change-speed transmission and engageable with said additional valve and operable incident to the selection of a high forward speed ratio power train in said transmission for actuating said additional valve so as to modify the effect of said selector valve and inhibit the actuation of the preselected hydraulic actuating device subsequent to the actuation of said additional valve.

12. A drive transmitting device comprising in combination, a power input shaft, a power output shaft, a change-speed transmission having power trains of different speed ratios selectively providable therethrough and being drivingly connected to said power output shaft, means for connecting said power input shaft with said change-speed transmission including a pair of clutches each of which includes a driven element and reversing means interconnecting the driven element of one of said clutches with said power output shaft and operative for reversing direction of rotation of drive transmitted between said input shaft and the change-speed transmission, said clutches being selectively operable for transmitting drive from the input shaft to the change-speed transmission so as to cause rotation of the output shaft in one direction when one of said pair of clutches is engaged and in another direction when the other of said pair of clutches is engaged, hydraulic means for actuating said clutches including a source of fluid pressure, hydraulically actuated devices for each of said clutches, a selector valve operable for connecting said source at will to either of said hydraulically actuated means, and an additional valve connected between said selector valve and the hydraulically actuated device which actuates the clutch that causes the change-speed transmission to rotate in a reverse direction and operable for modifying the effects of said selector valve on said latter hydraulically actuated device, and valve operating means positionable between an element of the highest forward speed-ratio power train of said change-speed transmission and said additional valve and operable for actuating said additional valve and thereby interrupting the flow of fluid pressure to and inhibiting the actuation of the hydraulic device for actuating the clutch that causes the change-speed transmission to rotate in a reverse direction responsive to said change-speed transmission being conditioned for operation in the highest forward speed-ratio power train thereof.

13. A drive transmitting device comprising in combination, a power input shaft, a power output shaft, a change-speed transmission having power trains of different speed ratios selectively providable therethrough and being drivingly connected to said power output shaft, means for connecting said power input shaft with said change-speed transmission including a pair of clutches each of which includes a driven element and reversing means interconnecting the driven element of one of said clutches with said power output shaft and operative for reversing direction of rotation of drive transmitted between said input shaft and the change-speed transmission, said clutches being selectively operable for transmitting drive from the input shaft to the change-speed transmission so as to cause rotation of the output shaft in one direction when one of said pair of clutches is engaged and in another direction when the other of said pair of clutches is engaged, hydraulic means for actuating said clutches including a source of fluid pressure, hydraulically actuated devices for each of said clutches, a selector valve operable for connecting said source at will to either of said hydraulically actuated device, a second valve means connected with said selector valve and operable for modifying the effect of said selector valve on a selected hydraulic actuating device and including means for the manual operation thereof, a third valve connected between said second valve and the hydraulically actuated device which actuates the clutch that causes the output shaft to rotate in a direction reverse to that of the input shaft and operable for modifying the effects of the selector valve and of said second valve on the selected hydraulic actuating device when the hydraulic device selected for actuation is the one that will effect the rotation of the output shaft in a direction reverse to that of said input shaft, and valve operating means positionable between an element of one of the speed-ratio power trains of said change-speed transmission and said third valve and operable for actuating said latter valve and interrupting the flow of fluid pressure to and inhibiting the actuation of the preselected hydraulic actuating device responsive to said change-speed transmission being conditioned for operation in the highest froward speed-ratio power train thereof.

References Cited in the file of this patent

UNITED STATES PATENTS

| | | |
|---|---|---|
| 2,278,351 | Havens et al. | Mar. 31, 1942 |
| 2,459,363 | Chamberlain | Jan. 18, 1949 |
| 2,670,714 | Gay et al. | Mar. 2, 1954 |
| 2,699,689 | Ahlen | Jan. 18, 1955 |
| 2,726,746 | Herndon et al. | Dec. 13, 1955 |
| 2,736,412 | Livezey | Feb. 28, 1956 |
| 2,775,328 | Yokel | Dec. 25, 1956 |
| 2,851,895 | Aschauer | Sept. 16, 1958 |